(12) United States Patent
Bergeron et al.

(10) Patent No.: US 6,570,708 B1
(45) Date of Patent: May 27, 2003

(54) IMAGE PROCESSING APPARATUS AND METHOD WITH LOCKING FEATURE

(75) Inventors: Alain Bergeron, Sainte-Foy (CA); Michel Doucet, Sainte-Foy (CA); Donald Prévost, Cap-Rouge (CA)

(73) Assignee: Institut National d'Optique, Ste-Foy (CA)

( * ) Notice: Subject to any disclaimer, the term of this patent is extended or adjusted under 35 U.S.C. 154(b) by 128 days.

(21) Appl. No.: 09/664,355

(22) Filed: Sep. 18, 2000

(51) Int. Cl.$^7$ ............................................. G02B 27/46
(52) U.S. Cl. ...................... 359/559; 359/558; 359/561; 382/210; 380/54
(58) Field of Search ................................ 359/558, 559, 359/561, 560; 382/210; 380/54

(56) References Cited

U.S. PATENT DOCUMENTS

| | | | | |
|---|---|---|---|---|
| 5,148,316 A | * | 9/1992 | Horner et al. ............... | 359/561 |
| 5,262,968 A | * | 11/1993 | Coffield .......................... | 708/5 |
| 5,485,312 A | | 1/1996 | Horner et al. | |
| 5,841,907 A | * | 11/1998 | Javidi et al. ................. | 382/210 |
| 6,002,773 A | * | 12/1999 | Javidi .......................... | 380/54 |

OTHER PUBLICATIONS

Bahram Javidi et al., Experimental demonstration of the random phase encoding technique for image encryption and security verification, Opt. Eng. 35(9) pp. 2506–2512, Sep. 1996.

Hoon–Gee Yang et al., Practical image encryption scheme by real–valued data, Opt. Eng. 35(9) pp. 2473–2478, Sep. 1996.

Ruikang K. Wang et al., Random phase encoding for optical security, Opt. Eng. 35(9), pp. 2464–2469, Sep. 1996.

Luiz Goncalves Neto et al., Optical implementation of image encryption using random phase encoding, Opt. Eng. 35(9), pp. 2459–2463, Sep. 1996.

Pawel Stepien et al., Distributed kinoforms in optical security applications, Opt. Eng. 35(9), pp. 2453–2458, Sep. 1996.

(List continued on next page.)

*Primary Examiner*—Thong Nguyen
*Assistant Examiner*—Fayez Assaf
(74) *Attorney, Agent, or Firm*—Ogilvy Renault; James Anglehart

(57) ABSTRACT

An optical coherent processor or correlator for processing an input image produced by an imaging device illuminated by a coherent light source utilizes an optical key for preventing unauthorized use of the processor. The principle underlying processing apparatus and method according to the invention uses an optical lock in combination with an encoded software key superimposed on a filter image. The optical lock, which is preferably in hardware form, consists of a first optical mask implementing a locking mask function that is preferably complex (phase and/or amplitude), which first optical mask is included in the optical path of the processor. The mask is fixed during assembly of the processor or correlator and a unique pattern is encoded thereon. The software key consists of a pattern defined by a key mask function that is displayed preferably using a spatial light modulator as part of a second optical mask included on the processor optical path. The key mask function is designed to compensate for the wave-front distortion generated by the locking mask function of the first optical mask. Therefore, an optical processor or correlator provided with its unique hardware lock cannot generates useful correlation, unless a corresponding unique software key is used.

52 Claims, 1 Drawing Sheet

OTHER PUBLICATIONS

James D. Brasher et al., Incoherent optical correlators and phase encoding of identification codes for access control or authentication, Opt. Eng. 36(9), pp. 2409–2416, Sep. 1997.

Bahram Javidi et al., Fully phase encoded key and biometrics for security verification, Opt. Eng. 36(3), pp. 935–942, Mar. 1997.

Philippe Refregier et al., Optical image encryption based on input plane and Fourier plane random encoding, Optics Letters, vol. 20, No. 7, pp. 767–769 Apr. 1, 1995.

Bahram Javidi et al., Optical pattern recognition for validation and security verification, Optical Engineering, vol. 33, No. 6, pp. 1752–1756, Jun. 1994.

Aris Tanone et al., Phase modulation depth for a real–time kinoform using a liquid crystal television, Optical Engineering, vol. 32, No. 3, pp. 517–521, Mar. 1993.

L. B. Lesem et al., The Kinoform: A new wavefront reconstruction device, IBM J. Res. Develop., pp. 150–155, Mar. 1969.

* cited by examiner

IMAGE PROCESSING APPARATUS AND METHOD WITH LOCKING FEATURE

FIELD OF THE INVENTION

The present invention relates to the field of optical processing, and more particularly to optical coherent processors.

DESCRIPTION OF PRIOR ART

Optical processors or correlators have been used for years in many different applications among which are target tracking, quality control and pattern recognition. In a typical optical correlator, a coherent source such as a laser generates a light beam that is collimated to illuminate an input imaging object or device as part of the correlator for generating an input image to be processed. The correlator comprises a first lens used to perform a first Fourier transform of the input image, which transform appears in the Fourier or filter plane. As well known by one skilled in the art, when applied to optical processing, the Fourier transform is a complex (real and imaginary parts) function resulting to an optical pattern lying in the spatial frequency domain. The correlator further comprises a second imaging device positioned within the Fourier plane to display a selected filter. At the filter plane, the Fourier transform of the input image is multiplied by the transmission function displayed on the filter device, to produce a combined image. Typically, the characteristics of the filter can be adapted either to perform pattern recognition, wherein the filter characteristics are based on the Fourier transform of a reference object to be recognized, or to perform filtering or other processing operations based on a predetermined mathematical function. The correlator further comprises a second lens for performing the inverse-Fourier transform of the combined image, resulting to a correlated, convoluted or filtered image, depending of the particular processing or filter function used. Known optical correlators or processors commonly use a spatial light modulator as the second imaging device, which modulator is conveniently computer-controlled using a specific software implementing a plurality of processing or filter functions that can be selected by one or more users. Especially in the case where the use of an optical correlator or processor should be limited to a reduced number of persons within an organization, it is desirable to provide particular means for limiting system access to authorized persons only. Furthermore, each individual user might require that information specific to his work, e.g. operation parameters, specific processing functions, as stored in the computer memory of the system could not be accessed by unauthorized users.

Phase masks have been used for long time mainly in the domain of kinoforms as described by L. B. Lesem et al. in "*The kinoform, a new wavefront reconstruction device*", IBM J. Res. Develop, vol. 13, p. 150, 1969, and by A. Tanone et al. in "*Phase modulation depth for a real-time kinoform using a liquid crystal television*", Optical Engineering, vol. 32, no. 3, p. 517, 1993. In the design of kinoforms, phase masks have been used to generate pattern diffraction so that, when illuminated by coherent light, the encoded pattern is observed in the far-field of propagation.

More recently, phase masks have been applied to optical image encryption and decryption of information encoded on an object or to authenticate the object in itself. In a typical phase encryption/decryption application, a phase key is incorporated in an input external object presented to a correlator which comprises a fixed key. The use of phase masks for various security purposes is abundantly referred to in the literature. In U.S. Pat. No. 5,485,312 issued on Jan. 16, 1996 to Horner et al., there is disclosed an optical pattern recognition system and method for verifying the authenticity of an object, which employ a joint transform coherent optical processor. An unreadable and hence counterfeit-proof encrypted phase mask is coupled to the object and the optical processor compares the phase mask with a reference phase mask having the same phase code thereon. The processor produces a correlation spot having an intensity that exceeds a given level if the phase mask is genuine. In "*Optical pattern recognition for validation and security identification*", Optical Engineering, vol. 33, no. 6, 1994, p. 1752, and in "*Fully phase encoded key and biometrics for security versification*" Optical Engineering, vol. 36, no. 3, p. 935, 1997, B. Javidi et al. teach encryption and decryption techniques for authenticating an object with a phase mask in a spatial plane, external to a correlator, without discussing alignment and/or rotation problems that are likely to occur with such techniques. In "*Optical image encryption based on input plane and Fourier plane random encoding*", Optics Letters, vol. 20, no. 7, p. 767, P. Refregier and al. teach the use of a two-phase mask for carrying out image encryption and decryption, without consideration of alignment and speckle noise problems that are likely to be observed. In "*Incoherent optical correlators and phase encoding of identification codes for access control of authentication*" Optical Engineering, Vol. 36, no. 9, p. 2409 1997, J. Brashner et al. propose the use of incoherent processors for encryption and decryption, for the purpose of authenticating separate objects. In "*Distributed kinoforms in optical security applications*" Optical Engineering, vol. 35, no. 9, p. 2453, 1996, P. Stepien and al. teach decryption and encryption of information techniques that are based on computer generated holograms. In "*Optical implementation of image encryption using random phase encoding*", Optical Engineering, vol. 35, no. 9, p. 2459. 1996, G. Neto et al. propose a correlator architecture for encryption and decryption, where speckle noise problems are taken into consideration. In "*Random phase encoding for optical security*", Optical Engineering, vol. 35, no. 9, p. 2464, 1996, R. K. Wang teaches encryption and decryption techniques also using an optical correlator, without considering alignment and/or rotation problems that are inherent to such techniques. In "*Practical image encryption scheme by real-valued data, Optical Engineering*", vol. 35, no. 9, p. 2473, 1996, H.-G. Yang et al. describe encryption and decryption schemes that are based on amplitude reference mask and object. In "*Experimental demonstration of the random phase encoding technique for image encryption*", Optical Engineering, vol. 35, no. 9, p. 2506, 1996, Javidi et al. report experimental results of encryption and decryption performed with techniques using an optical correlator, wherein bending, noise, and scratches problems were observed with these techniques.

SUMMARY OF THE INVENTION

It is therefore a main object of the present invention to provide image processing apparatus and method with a locking feature, for limiting access thereof to authorized persons only.

It is a further object of the present invention to provide image processing apparatus and method with locking feature ensuring that processing information specific to a user could not be accessed by unauthorized users.

It is a still further object of the present invention to provide a lock device for controlling the use of an optical image processor.

It is another object of the present invention to provide image processing apparatus and method as well as lock device and method for controlling the use of an optical image processor, which make use of an optical mask implementing a locking mask function and without including any movable part, thereby obviating problems of alignment in position/rotation, bending, scratches, space bandwidth, or speckle inherent to the use of an external object as taught in the prior art.

The present invention can be generally defined as an optical key for preventing unauthorized use of an optical coherent processor and more precisely of an optical correlator. The principle underlying this invention uses an optical lock in combination with an encoded software key superimposed on a filter image. The optical lock, preferably in hardware form, consists of a first optical mask implementing a locking mask function that is preferably complex (phase and/or amplitude) which first optical mask is included in the optical path of the correlator. The mask is fixed during assembly of the correlator and a unique pattern is encoded thereon. The software key consists of a pattern defined by a key mask function that is displayed preferably using a spatial light modulator as part of a second optical mask included on the correlator optical path. The key mask function is designed to compensate for the wave-front distortion generated by the locking mask function of the first optical mask. Therefore, a correlator provided with its unique hardware lock cannot generate useful correlation, unless a corresponding unique software key is used.

According to the above mentioned objects, from a broad aspect of the present invention, there is provided an apparatus for processing an input image produced by an imaging device illuminated by a coherent light source. The apparatus comprises first Fourier transform means for performing the Fourier transform of the input image to generate a corresponding transformed input image in the spatial frequency domain within an area defined by a Fourier transform filter plane, and first optical mask means being disposed within said area, said first optical mask implementing a locking mask function. The apparatus further comprises data processor means for generating filter mask function control data, second optical mask means disposed within said area, said second optical mask means implementing a filter mask function according to the filter mask function control data to generate with the locking mask function a combined image in the spatial frequency domain, and second Fourier transform means for performing the inverse Fourier transform of the combined image to generate a processed image only if the filter mask function control data include key control data corresponding to a key mask function complementary to the locking mask function for substantially cancel the locking effect thereof.

From another broad aspect of the invention, there is provided a lockable coherent optical processing apparatus comprising a laser source for generating substantially coherent light, an input imaging device receiving the coherent light to produce an input image, first Fourier transform means for performing the Fourier transform of the input image to generate a corresponding transformed input image in the spatial frequency domain within an area defined by a Fourier transform filter plane, and first optical mask means being disposed within said area, said first optical mask implementing a locking mask function. The apparatus further comprises data processor means for generating filter mask function control data, second optical mask means disposed within said area, said second optical mask means implementing a filter mask function according to the filter mask function control data to generate with the locking mask function a combined image in the spatial frequency domain, and second Fourier transform means for performing the inverse Fourier transform of the combined image to generate a processed image only if the filter mask function control data include key control data corresponding to a key mask function complementary to the locking mask function for substantially cancel the locking effect thereof.

From still another broad aspect of the invention, there is provided an optical correlator for analyzing an input image produced by an imaging device illuminated by a coherent light source. The optical correlator comprises first Fourier transform means for performing the Fourier transform of the input image to generate a corresponding transformed input image in the spatial frequency domain within an area defined by a Fourier transform filter plane and first optical mask means being disposed within said area, said first optical mask implementing a locking mask function. The correlator further comprises data processor means for generating filter mask function control data, second optical mask means disposed within said area, said second optical mask means implementing the filter mask function according to the filter mask function control data to generate with the locking mask function a combined image in the spatial frequency domain, and second Fourier transform means for performing the inverse Fourier transform of the combined image to generate a correlation indicating image only if the filter mask function control data include key control data corresponding to a key mask function complementary to the locking mask function for substantially cancel the locking effect thereof.

From a further broad aspect of the invention, there is provided a lock device for controlling the use of an optical image processor including a laser source for generating and directing substantially coherent light onto an input imaging device producing an input image, first Fourier transform means for performing the Fourier transform of the input image to generate a corresponding transformed input image in the spatial frequency domain within an area defined by a Fourier transform filter plane, second Fourier transform means for performing the inverse Fourier transform of the transformed input image to be combined in the spatial domain with a filter mask image to generate a processed image. The lock device comprises first optical mask means being disposed within said area, said first optical mask implementing a locking mask function, data processor means for generating filter mask function control data and second optical mask means disposed within said area, said second optical mask means implementing a filter mask function according to the filter mask function control data to generate with the locking mask function the filter mask image, wherein the processed image is generated by the image processor only if the filter mask function control data include key control data corresponding to a key mask function complementary to the locking mask function for substantially cancel the locking effect thereof.

From a still further broad aspect of the invention, there is provided a method of processing an input image produced by an imaging device illuminated by a coherent light source. The method comprises the steps of a) performing the Fourier transform of the input image to generate a corresponding transformed input image in the spatial frequency domain within an area defined by a Fourier transform filter plane; b) combining the transformed input image with a filter mask image and a locking mask image respectively defined by a filter mask function and a locking mask function to generate a combined image in the spatial frequency domain; and c)

performing the inverse Fourier transform of the combined image to generate a processed image only if the filter mask function include a key mask function complementary to the locking mask function for substantially cancel the locking effect thereof.

BRIEF DESCRIPTION OF THE DRAWING

Preferred embodiments of the processing apparatus, method and locking device according to the present invention will be now described in view of the accompanying drawing in which.

DETAILED DESCRIPTION OF THE PREFERRED EMBODIMENTS

Figure 1:
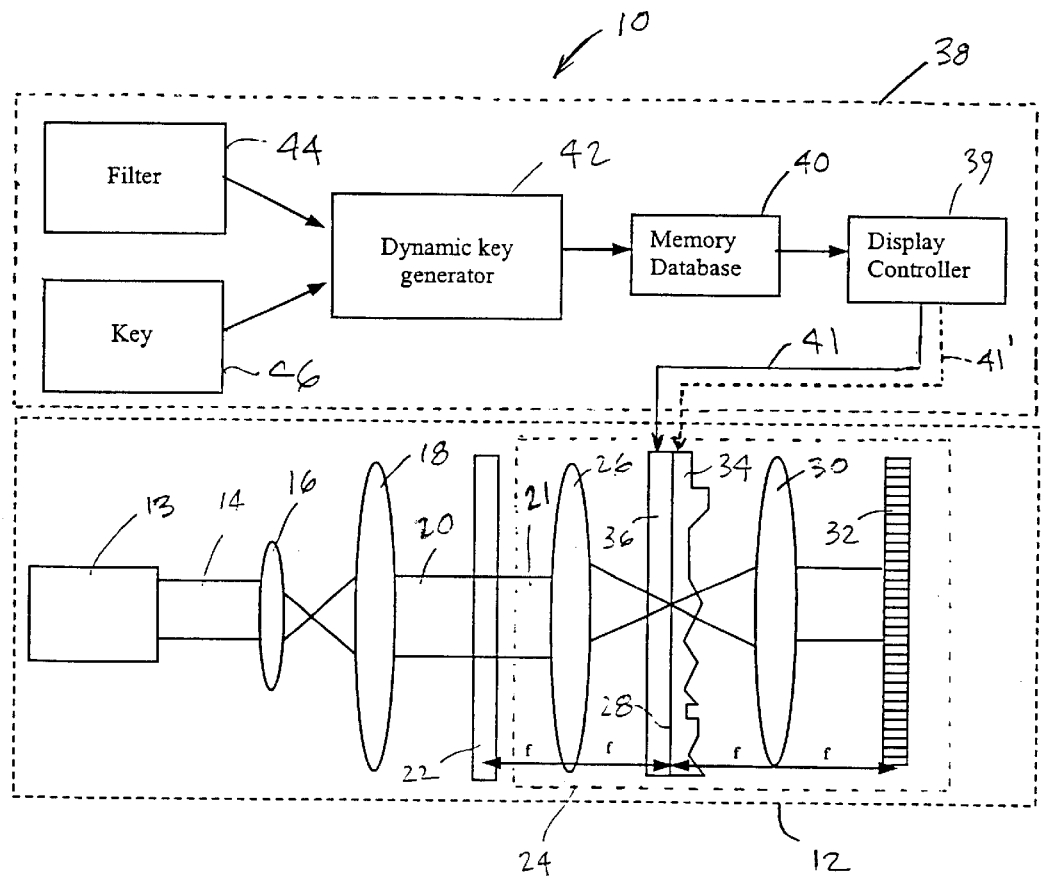
FIG. 1 is as schematic view of an optical processor linked to a computer-based controller represented by a block diagram.

Reference is now made to FIG. 1 illustrating an optical processing apparatus generally designated at 10, which comprises an optical module 12 including a coherent light source 13 such as a laser or laser-diode, which could be of a He—Ne type or any other suitable type, for generating a beam 14 of coherent light that is directed toward a collimator formed by an objective 16 followed by a collimating lens 18 for directing a collimated beam 20 of coherent light toward an input imaging device 22, which generates an input image when illuminated by the incident collimated coherent light. For example, in a pattern recognition application, the input imaging device can be a spatial light modulator such as a liquid crystal display or other suitable display device generating a pattern for which validation or identification has to be made using one or more known reference patterns. With a spatial light modulator, the pattern can be dynamically displayed allowing it to be conveniently changed when analyzing several patterns. The pattern is revealed either through coherent light transmission forming a beam 21 as in the example shown in FIG. 1, or through coherent light reflection by setting an appropriate incident light angle with respect to the applied pattern. The optical module 12 further includes an optical processor 24 such as a four-f correlator in the example shown in FIG. 1, which has a first lens 26 disposed in front of the input imaging device 22 and having its optical plane being distant from the optical plane of imaging device 22 by a focal length (f). The first lens 26 performs the Fourier transform of the input image and generates a corresponding transformed input image in the complex spatial frequency domain, within an area defined by a Fourier transform filter plane represented at 28, which is also distant from the optical plane of first lens 26 by one focal length (f). The optical processor 24 has a second lens 30 having its optical plane laying two focal length (2f) from the optical plane of first lens 26, for performing the inverse Fourier transform of a combined image formed within the area defined by filter plane 28, as will be explained later in detail. The processed image resulting from the inverse Fourier transform of the combined image is captured by a conventional optical detector array 32 generating electrical output signals indicative of the light intensity distribution resulting from the optical processing, which signals can be acquired and analyzed by any suitable instrumentation. While a typical four-f correlator is employed in the example shown in FIG. 1 for sake of simplicity, it is to be understood that any other type of optical correlator or processor using a different architecture can be employed to practice the present invention. The optical module 12 further includes a first optical mask 34 disposed within the area defined by filter plane 28, which mask 34 implements a unique locking mask function L(u,v), which is either a phase mask function or a complex (phase and amplitude) mask function, characterized by continuous or discrete phase and amplitude variation in the spatial domain, which function is preferably expressed by the following relation:

$$L(u,v)=A(u,v)e^{j\phi(u,v)} \quad (1)$$

wherein A(u,v) is an amplitude component of the locking mask function, φ(u,v) is a phase amplitude component of the locking mask function and (u,v) are the spatial coordinates in the Fourier transform filter plane 28. Although the locking mask function L(u,v) is preferably made unique for a particular optical processor, it may also be common to a limited set of optical processors. The optical mask 34 is preferably built in a fixed, permanent form with glass or plastic material, or with any transparent or semi-transparent material showing suitable optical characteristics, provided that the wave-front distortion introduced by the resulting mask as compared to the desired locking mask function is within a maximum predetermined value, which can be generally set to less than one wavelength characterizing the light source used with the optical processor. The phase variation can be introduced by a variation of the material thickness, by a change of refractive index of the material or by any other suitable optical technique.

Alternatively, the optical mask 34 may be of a dynamic type allowing change of locking mask function, e.g. using a conventional computer-controlled spatial light modulator supporting phase recording, as will be describer later in more detail.

The optical unit further includes a second optical mask 36 also disposed within the area defined by filter plane 28, which mask 36 implements a filter mask function to generate with the locking mask function provided by first optical mask 34 the combined image in the spatial domain. The second optical mask 36 is of a dynamic type allowing complex variation of filter mask function, being preferably a computer-controlled spatial light modulator supporting phase recording, as will be explained later in more detail. The combination of first and second optical masks 34, 36 may be considered as a further imaging device receiving light forming the input image as displayed by imaging device 22, to display within the area defined by filter plane 28, the resulting combined image as modulated by filter mask and locking mask functions. Since the optical masks 34, 36 are preferably disposed in an aligned, adjacent relationship, alignment problems related to position/rotation, bending, scratches, space bandwidth, or speckle is therefore prevented or reduced. The filter mask function characteristics can be adapted either to perform pattern recognition, wherein the filter mask function characteristics are based on the Fourier transform of a reference object to recognized, or to perform filtering or other processing operations based on a predetermined mathematical function. The Fourier transform of the input image is multiplied by the displayed transmission function resulting from the combination of first and second optical masks 34, 36, and the resulting combined image is inverse-Fourier transformed with second lens 30. Depending on the characteristics of the filter function used, the processed output is a correlated, a convoluted or simply a filtered image, wherein the complex characteristics (amplitude and/or phase) of the locking mask function L(u,v) may be chosen so as to improve the filtering operation.

Since, the complex mask contains a certain continuous or discrete phase and/or amplitude function varying spatially, the optical module 12 cannot perform processing unless, in accordance with the present invention, the filter mask function implemented in second optical mask 36 includes a key mask function K(u,v) complementary to the locking mask function for substantially cancel the locking effect thereof. In order to be complementary to the locking mask function defined in equation (1) above, the key mask function is preferably expressed by the following relation:

$$K(u,v)=1/A(u,v)e^{j\phi(u,v)} \quad (2)$$

It is to be understood that the key mask function K(u,v) may be not exactly as defined in equation (2), provided it significantly compensates for the disturbing effect of the locking mask.

The optical processing apparatus 10 further comprises a control computer used as a data processor and schematically represented at 38, the main purpose of which is to generate through a display controller 39 and line 41 filter mask function control data for the second optical mask 36. The control computer 38 incorporates a memory database 40 for storing encrypted data representing a plurality of selectable filter mask functions produced by a dynamic key generator 42, whereby each filter mask function is formed by a respective processing or filter function as represented at 44 and the key mask function K(u,v) as represented at 46, in a programmable manner. The filter mask function control data being preferably coded in the form of an executable software format, information about the key mask function K(u,v) cannot be easily found unless the executable code itself is decoded. Since the filter mask function control data stored in memory database 40 cannot be decoded without the code, that information is protected against any user who should not have access to it. For example, if one attempts to use a database generated with another software that does not implement the chosen key mask function K(u,v) for the optical processor, the latter could not be operated in a useful manner. Moreover, since the data characterizing the filter are saved with the key mask function data into database 40, it would be not feasible or at least difficult to decode or analyze the saved filter data.

Moreover, since the first optical mask 34 according to the preferred embodiment physically implements the locking mask function L(u,v) whose phase information cannot be revealed without special instrumentation using a complex procedure, the locking mask function L(u,v) cannot be easily determined to derive a suitable corresponding key mask function K(u,v).

In an embodiment where first optical mask 34 is of a dynamic type using a conventional computer-controlled spatial light modulator, the computer 38 is also used as a data processor for generating through display controller 39 and line 41' locking mask function control data for first optical mask 34, whereby the locking mask function L(u,v) is implemented accordingly. Although the improved security inherent to physical implementation of optical mask 34 is not provided in such all software-based locking embodiment, since the locking mask function control data, which may correspond to a plurality of selectable locking mask functions assigned to a plurality of users, are encrypted into memory database 40, a high security level is still provided. In all embodiments, the locking mask function L(u,v) implemented by first optical mask 34 is chosen to be sufficiently complicated to ensure that the desired processing or correlation is not performed or is significantly reduced if the filter mask function control data sent to the second optical mask 36 either does not include key control data or includes wrong key control data. In the case where a correlator is used without a suitable software key, correlation peaks either cannot be observed, or cannot be interpreted adequately.

Furthermore, the characteristics of filter mask function and key mask function K(u,v) can be chosen so as to improve dynamic range of the spatial light modulator used as filter mask 36 or to encode some specific filtering function.

A preferred mode of operation by a user of the optical apparatus according to the present invention will be now explained with reference to FIG. 1, in the context of a typical pattern recognition application. The user displays a scene to be analyzed on input imaging device 22, such scene being obtained with a standard camera, computer or other suitable imaging device. Then, using a conventional data entry device (not shown) and guided by a user interface software provided on computer 38, the user is asked to enter login name and appropriate password, which are then checked by the software before presenting a list of filter mask functions that this particular user is allowed to select. Then, control data specific to a filter mask function selected by the user, which control data include key control data corresponding to the key mask function K(u,v) complementary to the locking mask function L(u,v) implemented in the first optical mask 34, is read out from memory database 40 and sent by display controller through line 41 to the spatial modulator used as second optical mask 36, which is modulated in accordance with the selected filter mask function. Finally, laser source 13 is switched on to generate coherent light beam 14, becoming collimated beam 20 which then reaches imaging device 22 for generating the input image. Fourier transform of the input image is then performed by first lens 26 to generate the corresponding transformed input image in the complex spatial domain near or at Fourier transform filter plane 28. The Fourier transform of the input image is multiplied by the displayed transmission function resulting from the combination of first and second optical masks 34, 36, which implement filter mask function and locking mask function respectively, and the resulting combined image is inverse-Fourier transformed with second lens 30. The processed image resulting from the inverse Fourier transform of the combined image is captured by optical detector array 32 generating electrical output signals indicative of the light intensity distribution resulting from the optical processing. Since the filter mask function control data that modulate second optical mask 36 include key control data corresponding to the specific key mask function K(u,v) that is complementary to the locking mask function L(u,v) implemented in first optical mask 34, the locking effect thereof is substantially canceled, and the optical processing apparatus is rendered entirely functional accordingly.

We claim:

1. An apparatus for processing an input image produced by an imaging device illuminated by a coherent light source, said apparatus comprising:

first Fourier transform means for performing the Fourier transform of said input image to generate a corresponding transformed input image in the spatial frequency domain within an area defined by a Fourier transform filter plane;

first optical mask means being disposed within said area, said first optical mask implementing a locking mask function;

data processor means for generating filter mask function control data;

second optical mask means disposed within said area, said second optical mask means implementing a filter mask function according to said filter mask function control data to generate with said locking mask function a combined image in the spatial frequency domain;

second Fourier transform means for performing the inverse Fourier transform of said combined image to generate a processed image only if said filter mask function control data include key control data corresponding to a key mask function complementary to said locking mask function for substantially cancel the locking effect thereof.

2. The apparatus of claim 1, wherein said locking mask function is a phase mask function.

3. The apparatus of claim 1, wherein said locking mask function is a complex mask function.

4. The apparatus of claim 3, wherein said locking mask function is expressed by the following relation:

$$L(u,v)=A(u,v)e^{j\phi(u,v)}$$

wherein:

A(u,v) is an amplitude component of said locking mask function;

$\phi(u,v)$ is a phase amplitude component of said locking mask function;

(u,v) are the spatial coordinates in said Fourier transform filter plane.

5. The apparatus of claim 4, wherein said key mask function is expressed by the following relation:

$$K(u,v)=1/A(u,v)e^{j\phi(u,v)}.$$

6. The apparatus of claim 1, wherein said first optical mask means include an optical element having a profile specifically shaped to provide said reference locking mask function.

7. The apparatus of claim 1, wherein said second optical mask means include a spatial light modulator.

8. The apparatus of claim 1, wherein said data processor means for generating filter mask function control data include a computer having a memory for storing data representing said filter mask function as a selected one of a plurality of selectable filter mask functions each formed by a respective processing function and said key mask function.

9. The apparatus of claim 8, wherein said second optical mask means include a spatial light modulator.

10. The apparatus of claim 8, wherein said stored data is encrypted into said memory.

11. The apparatus of claim 1, further comprising data processor means for generating locking mask function control data, said locking mask function being implemented according to said locking mask function data.

12. The apparatus of claim 11, wherein said first optical mask means includes a spatial light modulator.

13. The apparatus of claim 11, wherein said data processor means for generating locking mask function control data include a computer having a memory for storing data representing said locking mask function as a selected one of a plurality of locking mask functions that can be selected for said apparatus.

14. The apparatus of claim 13, wherein said first optical mask means includes a spatial light modulator.

15. The apparatus of claim 11, further comprising data processor means for generating processing mask function data, said first optical mask means further implementing a corresponding processing mask function used to generate said combined image.

16. The apparatus of claim 15, wherein said first optical mask means includes a spatial light modulator.

17. A lockable coherent optical processing apparatus comprising:

a laser source for generating substantially coherent light;

an input imaging device receiving the coherent light to produce an input image;

first Fourier transform means for performing the Fourier transform of said input image to generate a corresponding transformed input image in the spatial frequency domain within an area defined by a Fourier transform filter plane;

first optical mask means being disposed within said area, said first optical mask implementing a locking mask function;

data processor means for generating filter mask function control data;

second optical mask means disposed within said area, said second optical mask means implementing a filter mask function according to said filter mask function control data to generate with said locking mask function a combined image in the spatial frequency domain;

second Fourier transform means for performing the inverse Fourier transform of said combined image to generate a processed image only if said filter mask function control data include key control data corresponding to a key mask function complementary to said locking mask function for substantially cancel the locking effect thereof.

18. An optical correlator for analyzing an input image produced by an imaging device illuminated by a coherent light source, said optical correlator comprising:

first Fourier transform means for performing the Fourier transform of said input image to generate a corresponding transformed input image in the spatial frequency domain within an area defined by a Fourier transform filter plane;

first optical mask means being disposed within said area, said first optical mask implementing a locking mask function;

data processor means for generating filter mask function control data;

second optical mask means disposed within said area, said second optical mask means implementing said filter mask function according to said filter mask function control data to generate with said locking mask function a combined image in the spatial frequency domain;

second Fourier transform means for performing the inverse Fourier transform of said combined image to generate a correlation indicating image only if said filter mask function control data include key control data corresponding to a key mask function complementary to said locking mask function for substantially cancel the locking effect thereof.

19. The optical correlator of claim 18, wherein said locking mask function is a phase mask function.

20. The optical correlator of claim 18, wherein said locking mask function is a complex mask function.

21. The optical correlator of claim 20, wherein said locking mask function is expressed by the following relation:

$$L(u,v)=A(u,v)e^{j\phi(u,v)}$$

wherein:

A(u,v) is an amplitude component of said locking mask function;

φ(u,v) is a phase amplitude component of said locking mask function;

(u,v) are the spatial coordinates in said Fourier transform filter plane.

22. The optical correlator of claim 21, wherein said key mask function is expressed by the following relation:

$$K(u,v)=1/A(u,v)e^{j\phi(u,v)}.$$

23. The optical correlator of claim 18, wherein said first optical mask means include an optical element having a profile specifically shaped to provide said reference locking mask function.

24. The optical correlator of claim 18, wherein said second optical mask means include a spatial light modulator.

25. The optical correlator of claim 18, wherein said data processor means for generating filter mask function control data include a computer having a memory for storing data representing said filter mask function as a selected one of a plurality of selectable filter mask functions each formed by a respective processing function and said key mask function.

26. The optical correlator of claim 25, wherein said second optical mask means include a spatial light modulator.

27. The optical correlator of claim 25, wherein said stored data is encrypted into said memory.

28. The optical correlator of claim 18, further comprising data processor means for generating locking mask function control data, said locking mask function being implemented according to said locking mask function data.

29. The optical correlator of claim 28, wherein said first optical mask means includes a spatial light modulator.

30. The optical correlator of claim 28, wherein said data processor means for generating locking mask function control data include a computer having a memory for storing data representing said locking mask function as a selected one of a plurality of locking mask functions that can be selected for said apparatus.

31. The optical correlator of claim 30, wherein said first optical mask means includes a spatial light modulator.

32. A lock device for controlling the use of an optical image processor including a laser source for generating and directing substantially coherent light onto an input imaging device producing an input image, first Fourier transform means for performing the Fourier transform of said input image to generate a corresponding transformed input image in the spatial domain within an area defined by a Fourier transform filter plane, second Fourier transform means for performing the inverse Fourier transform of said transformed input image to be combined in the spatial frequency domain with a filter mask image to generate a processed image; said lock device comprising:

first optical mask means being disposed within said area, said first optical mask implementing a locking mask function;

data processor means for generating filter mask function control data;

second optical mask means disposed within said area, said second optical mask means implementing a filter mask function according to said filter mask function control data to generate with said locking mask function said filter mask image, wherein said processed image is generated by said image processor only if said filter mask function control data include key control data corresponding to a key mask function complementary to said locking mask function for substantially cancel the locking effect thereof.

33. The device of claim 32, wherein said locking mask function is a phase mask function.

34. The device of claim 32, wherein said locking mask function is a complex mask function.

35. The device of claim 34, wherein said locking mask function is expressed by the following relation:

$$L(u,v)=A(u,v)e^{j\phi(u,v)}$$

wherein:

A(u,v) is an amplitude component of said locking mask function;

φ(u,v) is a phase amplitude component of said locking mask function;

(u,v) are the spatial coordinates in said Fourier transform filter plane.

36. The device of claim 35, wherein said key mask function is expressed by the following relation:

$$K(u,v)=1/A(u,v)e^{j\phi(u,v)}.$$

37. The device of claim 32, wherein said first optical mask means include an optical element having a profile specifically shaped to provide said reference locking mask function.

38. The device of claim 32, wherein said second optical mask means include a spatial light modulator.

39. The device of claim 32, wherein said data processor means for generating filter mask function control data include a computer having a memory for storing data representing said filter mask function as a selected one of a plurality of selectable filter mask functions each formed by a respective processing function and said key mask function.

40. The device of claim 39, wherein said second optical mask means include a spatial light modulator.

41. The device of claim 39, wherein said stored data is encrypted into said memory.

42. The device of claim 32, further comprising data processor means for generating locking mask function control data, said locking mask function being implemented according to said locking mask function data.

43. The apparatus of claim 42, wherein said first optical mask means includes a spatial light modulator.

44. The device of claim 42, wherein said data processor means for generating locking mask function control data include a computer having a memory for storing data representing said locking mask function as a selected one of a plurality of locking mask functions that can be selected for said device.

45. The apparatus of claim 44, wherein said first optical mask means includes a spatial light modulator.

46. The device of claim 42 further comprising data processor means for generating processing mask function data, said first optical mask further implementing a corresponding processing mask function used to generate said combined image.

47. The apparatus of claim 46, wherein said first optical mask means includes a spatial light modulator.

48. A method of processing an input image produced by an imaging device illuminated by a coherent light source, said method comprising the steps of:

a) performing the Fourier transform of said input image to generate a corresponding transformed input image in the spatial frequency domain within an area defined by a Fourier transform filter plane;

b) combining said transformed input image with a filter mask image and a locking mask image respectively defined by a filter mask function and a locking mask function to generate a combined image in the spatial domain; and c) performing the inverse Fourier transform of said combined image to generate a processed image only if said filter mask function include a key mask function complementary to said locking mask function for substantially cancel the locking effect thereof.

49. The method of claim 48, wherein said locking mask function is a phase mask function.

50. The method of claim 48, wherein said locking mask function is a complex mask function.

51. The method of claim 50, wherein said locking mask function is expressed by the following relation:

$$L(u,v)=A(u,v)e^{j\phi(u,v)}$$

wherein:
- A(u,v) is an amplitude component of said locking mask function;
- φ(u,v) is a phase amplitude component of said locking mask function;
- (u,v) are the spatial coordinates in said Fourier transform filter plane.

52. The apparatus of claim 51, wherein said key mask function is expressed by the following relation:

$$K(u,v)=1/A(u,v)e^{j\phi(u,v)}.$$

* * * * *